(12) United States Patent
Campbell

(10) Patent No.: US 6,766,084 B1
(45) Date of Patent: Jul. 20, 2004

(54) COARSE WAVE DIVISION MULTIPLEXER

(75) Inventor: James P. Campbell, Atherton, CA (US)

(73) Assignee: Stratos International, Inc., Chicago, IL (US)

( * ) Notice: Subject to any disclaimer, the term of this patent is extended or adjusted under 35 U.S.C. 154(b) by 322 days.

(21) Appl. No.: 09/938,911

(22) Filed: Aug. 24, 2001

Related U.S. Application Data

(60) Provisional application No. 60/228,222, filed on Aug. 25, 2000.

(51) Int. Cl.[7] .............................................. G02B 6/26
(52) U.S. Cl. ...................................................... 385/47
(58) Field of Search .............................. 385/47, 41, 42, 385/43, 44, 45, 46

(56) References Cited

U.S. PATENT DOCUMENTS

| | | | |
|---|---|---|---|
| 5,002,350 A | | 3/1991 | Dragone |
| 5,136,671 A | | 8/1992 | Dragone ........................ 385/46 |
| 5,412,744 A | | 5/1995 | Dragone ........................ 385/24 |
| 5,583,683 A | * | 12/1996 | Scobey ........................... 398/79 |
| 5,652,814 A | * | 7/1997 | Pan et al. ...................... 385/24 |
| 5,786,915 A | * | 7/1998 | Scobey ........................... 398/82 |
| 5,889,904 A | * | 3/1999 | Pan et al. ...................... 385/24 |
| 5,943,455 A | | 8/1999 | Travieso et al. .............. 385/24 |
| 5,969,836 A | | 10/1999 | Foltzer ........................ 359/114 |
| 5,999,290 A | | 12/1999 | Li ................................ 359/127 |
| 6,118,912 A | * | 9/2000 | Xu ................................. 385/24 |
| 6,167,171 A | * | 12/2000 | Grasis et al. .................. 385/24 |

* cited by examiner

*Primary Examiner*—Tulsidas C. Patel
(74) *Attorney, Agent, or Firm*—Karl D. Kovach

(57) ABSTRACT

A coarse wavelength division multiplexer/demultiplexer for combining and splitting different frequencies that are not as tightly separated as commonly known dense wavelength systems. Long-pass or short-pass optical filters are used to reflect certain wavelengths while passing others. In an embodiment, dual capillary GRIN lenses are coupled together to split off certain wavelengths while allowing others to pass.

5 Claims, 4 Drawing Sheets

COARSE WAVE DIVISION MULTIPLEXER

This application claims the benefit of U.S. provisional application No. 60/228,222, filed Aug. 25, 2000, which is hereby incorporated herein by reference.

BACKGROUND OF THE INVENTION

1. Field of the Invention

The present invention relates generally to optical devices, and more particularly to optical wavelength division multiplexers and demultiplexers.

2. Discussion of the Background

Optical waveguide technology provides an enormous improvement in bandwidth compared to copper wire. It is thus poised to revolutionize communication in several fields including, telephone, television, and the Internet. Optical waveguides are increasingly used to transmit information in which high density and high speed are required. With the growth of the Internet, demands for reasonably priced optical communication solutions continue to increase.

Optical wavelength division multiplexers and demultiplexers are important elements in optical technology. An optical wavelength division multiplexer receives two or more individual wavelengths (also referred to as colors or frequencies) and combines them into one signal on a single waveguide. An optical wavelength division demultiplexer receives an optical signal with two or more wavelengths from a single waveguide and separates the optical signal into its component frequencies. Optical multiplexers and demultiplexers are crucial to take advantage of the enormous bandwidth of optical waveguides.

Technology presently exists to provide optical waveguide communications from end user to end user through a high volume network. This technique is commonly referred to as Dense Wavelength transmission and requires that anywhere from 16 to 80 different frequencies be packed into a single transmission. The frequency separation of these numerous signals is very close, about 50 GHz–200 Ghz. At the end of each transmission, a Dense Wave Division Multiplexer/Demultiplexer (DWDM) combines and separates the various frequencies. But existing DWDM are difficult to manufacture due to the difficulty in differentiating closely spaced frequencies. As such, the costs are very high. Moreover, existing DWDM are costly to operate due to their relatively high temperature sensitivity. A temperature-controlled environment is often needed to ensure their proper operation.

While these costs may be acceptable for long transmissions carrying heavy data traffic, they are unacceptably high for many short transmissions carrying low data traffic. Such low data traffic transmissions are especially common in the so-called "last mile" of transmission (i.e., the distribution to individual locations) or for local networks. There the costs and other problems associated with DWDMs often prohibit their use. Accordingly, new devices and methods of their manufacture are desirable.

SUMMARY OF THE INVENTION

The present invention is directed toward coarse wavelength data transmission. In particular, it provides a coarse wavelength division multiplexer/demultiplexer for combining and splitting different frequencies that are not as tightly separated as commonly known dense wavelength systems. Because the tolerances of the system are not as stringent, the costs of manufacture and use as well as reliability are improved over the existing art.

Instead of the expensive band-pass filters used in the past, the present invention includes long-pass or short-pass filters to reflect wavelengths on one side of a specified frequency of the filter and to pass wavelengths on the other side of the specified frequency. Thus, a first I/O waveguide carrying an optical signal with a plurality of wavelengths is optically coupled to a second I/O waveguide through a filter. The first I/O waveguide is also optically coupled to a third I/O waveguide through filter. The filter may be a long-pass or a short-pass filter such that a first optical wavelength is reflected between the first I/O waveguide and the second I/O waveguide and a second wavelength is passed between the first I/O waveguide and the third I/O waveguide.

In an embodiment of the present invention, a dual capillary GRIN lens is optically coupled between the first I/O waveguide and the filter. The filter reflects the first wavelength between its first capillary (waveguide) and its second capillary and passes the second wavelength.

In another embodiment, the dual capillary GRIN lens is housed in a collimator assembly with the filter located between the dual capillary GRIN lens and a single capillary GRIN lens. A first collimator assembly has one of the capillaries of the dual capillary GRIN lens coupled to a first I/O waveguide and the other capillary coupled to a second similar collimator assembly. The capillary of the single capillary GRIN lens is coupled to one of the dual capillaries of a third collimator assembly. The remaining capillaries of the first, second, and third collimator assemblies are optically coupled to four additional I/O waveguides such that each is optically coupled through the collimator assemblies to the first I/O waveguide. The number of I/O waveguides and the number of collimator assemblies may be expanded or contracted to make a multiplexer or demultiplexer having a desired number of ports.

In yet another embodiment of the present invention, long or short-pass filters are optically coupled together along the optical axis of an I/O waveguide with a plurality of wavelengths. The specified wavelength of each filter changes monotonically such that each filter splits off a different wavelength and reflects that wavelength to a different waveguide. The other wavelengths pass to the next filter until all but one have been split off. The remaining wavelength passes to its own waveguide. Thus, light is reflected between the various individual waveguides and the I/O waveguide having the plurality of wavelengths. In another embodiment, the long-pass and short-pass filters are curved to focus the light as it is reflected.

A further understanding of the nature and advantages of the present invention may be realized by reference to the latter portions of the specification and attached drawings.

BRIEF DESCRIPTION OF THE DRAWINGS

A more complete appreciation of the invention and many of the attendant advantages thereof will be readily obtained as the same becomes better understood by reference to the following detailed description when considered with the accompanying drawings, wherein.

DESCRIPTION OF THE SPECIFIC EMBODIMENTS

Figure 1:
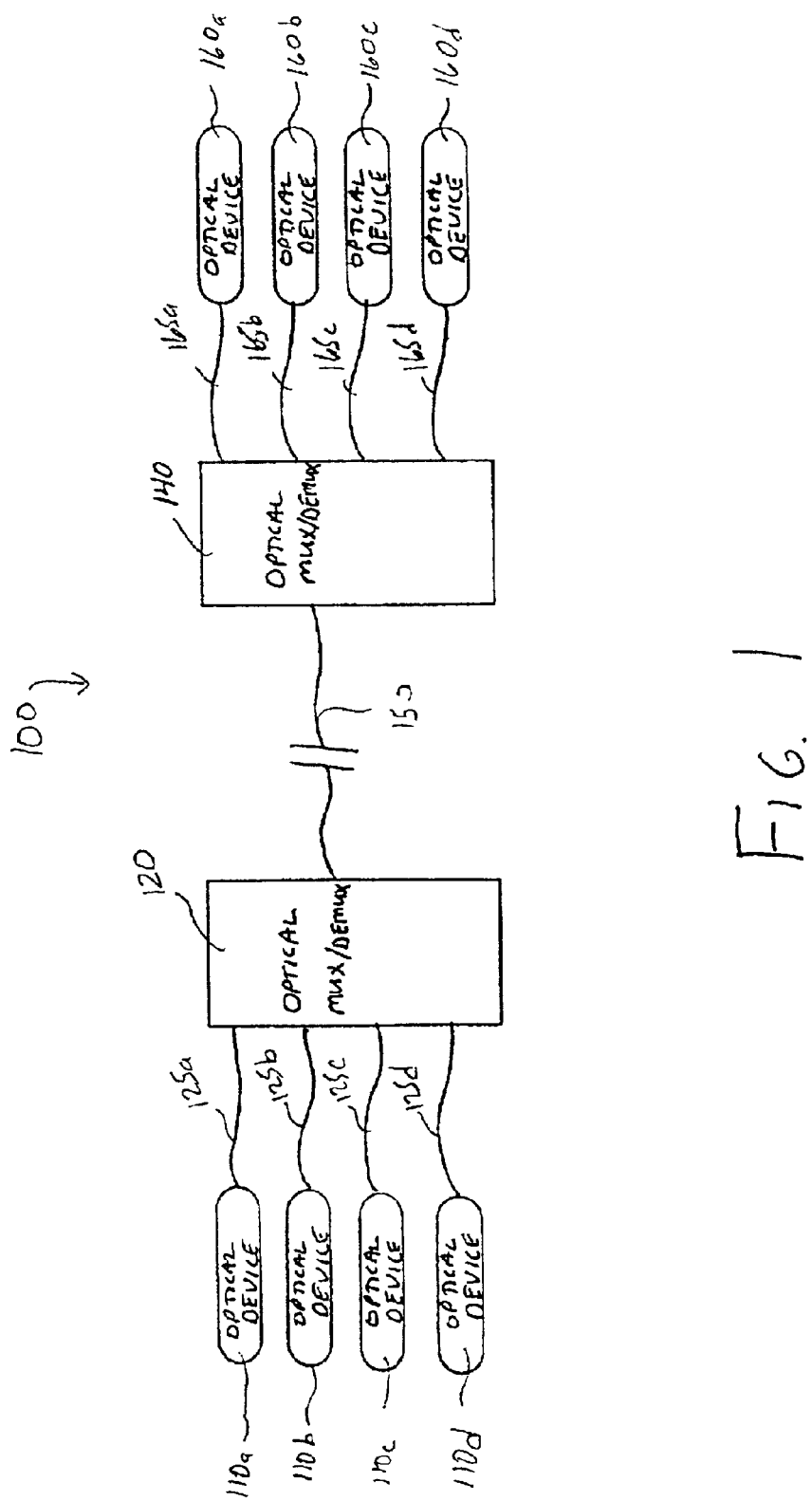
FIG. 1 is a block diagram of an optical system including a multiplexer/demultiplexer of the present invention.

Referring now to the drawings, wherein like reference numerals designate identical or corresponding parts throughout the several views.

FIG. 1 is a block diagram of an optical system 100 into which a device according to the present invention may be incorporated. Optical system 100 includes a plurality of optical devices 100a–d coupled to an optical multiplexer/demultiplexer 120 through optical waveguide 125a–d, respectively. Each optical device 110 is coupled to the optical multiplexer/demultiplexer through a separate waveguide 125 and carries one or more different wavelengths (also referred to as optical frequencies or colors). In the specific embodiment, each optical device 110 outputs a single wavelength onto waveguide 125 or receives a single wavelength from waveguide 125. Waveguide 125 may be a single waveguide that is used bidirectionally or, more likely, a pair of waveguides each transmitting in a different direction. The term "carry" is used to refer generically to transmittal of a wavelength without reference to direction of travel. Thus, a waveguide transmitting or receiving a particular wavelength is said to carry that wavelength.

Though four optical devices 110 are shown in FIG. 1, any number of optical devices may be used, depending on the capabilities of the technology and the application for which it is intended. Optical devices 110 may be lasers, optical switches, electrical converters, couplers, other optical multiplexer/demultiplexers, and the like. For example, optical devices 110 may include a distributed feedback (DFB) laser. DFB lasers are commercially available that are internally modulated at 2.5 gigabits/second, 3.7 gigabits/second, or 10 gigabits/second, for example. Moreover, optical devices 110 may all be the same type of device, or, some or all, may be different types of devices.

Optical multiplexer/demultiplexer 120 is coupled to another optical multiplexer/demultiplexer 140 by means of another waveguide 150. Optical multiplexer/demultiplexer 140 may be a duplicate of optical multiplexer/demultiplexer 120 or it may be of a different design entirely. Moreover, it may perform both multiplexing and demultiplexing functions, or it may only be capable of one or the other. There is no requirement that both multiplexer/demultiplexer 120 and multiplexer/demultiplexer 140 practice the principles of the present invention, although many applications may benefit greatly if they are so designed. Moreover, any of the embodiments described below may be used as either multiplexer/demultiplexer 120 or multiplexer/demultiplexer 140.

Optical multiplexer/demultiplexer 140 is also coupled to a plurality of optical devices 160a–d through waveguides 165a–d, respectively. Optical devices 160 may be any optical device such as those described above with regard to optical devices 110. They may all be different types of devices, or, some or all, may be exactly the same or similar types of devices. Also, any number of optical devices 160 may be included in system 100.

Optical multiplexer/demultiplexer 120 either receives individual signals with different wavelengths from each of the waveguides 125 and combines them into a single optical signal for output on waveguide 150 (the multiplexing function) or receives an optical signal with a plurality of different wavelengths from waveguide 150 and splits the wavelength onto the plurality of different waveguides 125 (the demultiplexing function). While FIG. 1 depicts a generic system in which optical multiplexer/demultiplexer 120 may be used, one of skill in the art will readily envision a variety of systems that would be benefited by its use. For example, local area networks, SONET networks, local inter-computer communication, local voice and video communication, distribution from a network and uploading to a network, and switching networks are all useful systems that would benefit from the present invention. For example, optical multiplexer/demultiplexer 120 may be used in an add/drop circuit for a SONET network. Those skilled in the art will recognize several additional applications for which the present invention is beneficial. Moreover, the future undoubtedly holds the promise of many other applications that will also benefit from the present inventions.

Figure 2:
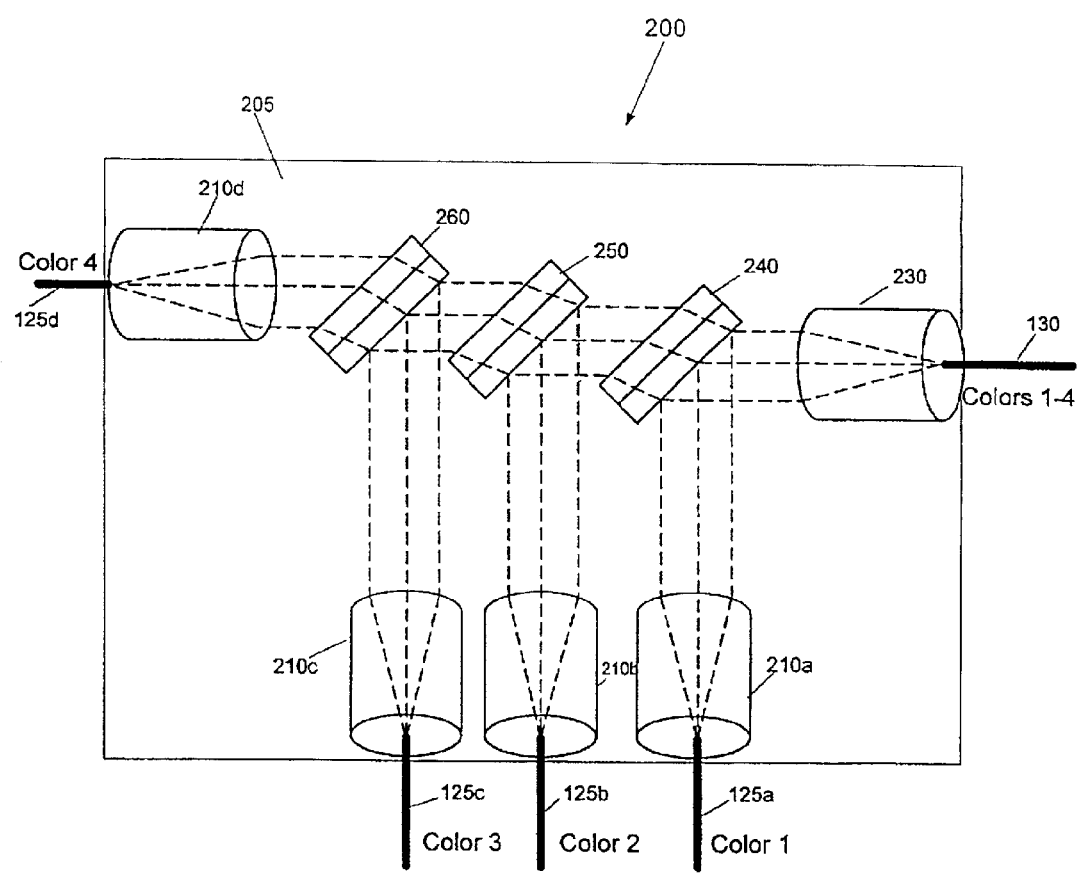
FIG. 2 is a diagram of a first embodiment of a multiplexer/demultiplexer of the present invention using planer filters.

FIG. 2 shows a first embodiment of a coarse wave division multiplexer/demultiplexer 200 according to the present invention. Optical multiplexer/demultiplexer 200 is preferably formed in a housing 205. Housing 205 is preferably designed to maintain the proper orientation of the various parts of multiplexer/demultiplexer 200. In the specific embodiment, housing 205 is a machined optical bench formed from aluminum, though other materials may also be used.

Waveguide 130 carries an optical signal with a plurality of different wavelengths. Waveguide 130 performs the function of an input terminal to multiplexer/demultiplexer 200 when operating as a demultiplexer and the function of an output terminal when operating as a multiplexer. Similarly, waveguides 125 perform the output terminal function when multiplexer/demultiplexer 200 acts as a demultiplexer and the input terminal function when it acts as a multiplexer. That is, when operating as a demultiplexer, multiplexer/demultiplexer 200 splits the different wavelengths from the signal on waveguide 130 onto waveguides 125. Similarly, when operating as a multiplexer, multiplexer/demultiplexer 200 combines the wavelengths on waveguides 125 into a single signal on waveguide 130. Though only four waveguides 125 are shown in FIG. 2, the invention is not so limited. More than four or less than four waveguides 125 may be used, limited only by the practicality of building parts that can differentiate between the various wavelengths.

Waveguide 130 carries a signal with a plurality of different wavelengths. For simplicity, the plurality of wavelengths is referred to as "color 1," "color 2," "color 3," and "color 4", though any number of wavelengths may be used. In the specific embodiment shown, the four wavelengths are separated by approximately 25.6 nanometers in wavelength, color 1 having the shortest wavelength, color 2 having a longer wavelength than color 1, color 3 having a longer wavelength than color 2, and color 4 having the longest wavelength of the four wavelengths. Of course, the separation between the wavelengths may be greater or lesser than the specific embodiment. Waveguides 125 each carry a different one of the four wavelengths while waveguide 130 carries all four wavelengths. Thus, in the specific embodiment, waveguide 125a carries color 1, waveguide 125b carries color 2, waveguide 125c carries color 3, and waveguide 125d carries color 4. Waveguide 130 carries colors 1–4.

Each of waveguides 125a–d is coupled to lenses 210a–d, respectively. Waveguide 130 is similarly coupled to a lens 230. Lenses 210 and 230 are preferably gradient index of refraction (GRIN) lenses. A GRIN lens is typically a transparent, cylindrical device formed from glass or other transparent material. It is characterized by having an index of refraction that varies predictably throughout the device. For example, the index of refraction at the center may be 1.52 and the refractive index at the edges may be 1.55 giving a difference of 0.03 through the radius. GRIN lenses are used especially for focusing a collimated beam of light into a narrow beam of light (if used in one direction) or dispersing a light source to create a collimated beam of light (if used in the other direction). Though the specific embodiment uses GRIN lenses for lenses 210 and 230, other lenses such as a spherical dielectric lens may also be used for some or all of lenses 210 and 230. For example, an f8 lens may be used. In some embodiments, lenses 210 or 230 may be omitted altogether.

In order to maintain their positioning within multiplexer/demultiplexer 200, lenses 210 and 230 are affixed to housing 205 by conventional methods. In the specific embodiment, lenses 210 and 230 are mounted in housing 205 and waveguides 125 and 130 extend outwardly from housing 205. Waveguides 125 and 130 connect to lenses 210 and 230 outside the housing. Other arrangements may easily be envisioned and are included within the scope of the present invention.

In the specific embodiment, a substrate (not shown) is also located within housing 205. One or more filters are mounted upon the substrate. The substrate is formed of laminated fused silica, though other appropriate materials may also be used. Channels are formed within the substrate. A first optical filter 240 is attached to the substrate in one of the channels formed in the substrate. The channel keeps filter 240 aligned at a desired position and at a desired angle. Preferably, filter 240 is aligned along the optical axis defined by waveguide 130. Second and third optical filters 250 and 260 are similarly attached to the substrate in their own channels and similarly aligned along the optical axis taking into account any deflection of the light in the filters.

Filters 240, 250, and 260 may be either long-pass filters or short-pass filters. Long-pass filters are characterized as having a specified wavelength such that wavelengths that are greater than the specified wavelength are passed, while wavelengths that are less than the specified wavelength are reflected. Similarly, short-pass filters pass those wavelengths that are less than the specified wavelength and reflect those wavelengths that are greater than the specified wavelength. Thus, generically speaking, long-pass filters and short-pass filters are characterized by passing the wavelengths on one side of the specified wavelength and reflecting those wavelengths on the other side of the specified wavelength. Therefore, though no generic term referring to both long-pass filters and short-pass filters is known, the term "single-side-pass filter" is used to refer generically to a filter that passes the wavelengths on one side of a specified wavelength and reflects those wavelengths on the other side of the specified wavelength. For simplicity, the following description is directed toward long-pass filters, but the principles of the present invention can be easily extended to short-pass filters.

In the specific embodiment, filters 240, 250, and 260 are long-pass filters with "specified wavelengths" at about 1524.38 nanometers, 1550.02 nanometers, and 1575.62 nanometers, respectively. Those of skill in the art will undoubtedly recognize other wavelengths that would be useful for separating wavelengths used in various applications. Filters 240, 250, and 260 have tolerances of less than two nanometers from their specified wavelength in either direction, though wider tolerances may be used so long as the wavelengths to be filtered are adequately distinguished.

Long-pass filters are well known in the art. Filters 240, 250, and 260 may be any such long-pass filters whether formed by a currently known process or by processes later conceived. Typically, filters 240, 250, and 260 are formed by sputtering several thin layers of different types of metal on a transparent substrate. The configuration of the metal layers determines the specified wavelength of a particular filter. Short-pass filters may be similarly formed. An advantage of these single-side-pass filters is that not as many layers are needed as for forming band-pass filters. As such, the yield in manufacturing is higher and the cost is lower.

Filter 240 is aligned with lens 230 and lens 210a such that the collimated beam of light from lens 230 strikes it in one of its surfaces. Filter 240 reflects the light emitted from waveguide 130 that is shorter than the specified wavelength (color 1) and allows the longer wavelengths to pass (colors 2, 3, and 4). It is oriented such that the reflected light is reflected at approximately a 90-degree angle to lens 210a. Preferably, it is exactly 90 degrees. Filter 250 is aligned on the opposite side of filter 240 such that the collimated beam of light in the wavelengths that were passed through filter 240 strike one of its surfaces. Filter 250 reflects the light with a shorter wavelength than the specified wavelength (color 2) and passes the longer wavelengths (colors 3 and 4). Filter 250 is oriented such that the reflected light is reflected at a 90-degree angle to lens 210b. Similarly, filter 260 is aligned on the opposite side of filter 250 such that the collimated beam of light in the wavelengths that were passed through filter 250 strike one of its surfaces. Filter 260 reflects the light with a shorter wavelength than its specified wavelength (color 3) and passes the longer wavelengths (color 4). Filter 260 is oriented such that the reflected light is reflected at a 90-degree angle to lens 210c. The remaining non-reflected light (color 4) passes on to lens 210d. It will be recognized that such a device may split multiple wavelengths to any of the different waveguides 125 if they fall within the range of frequencies between the specified wavelengths of the filters. Accordingly, it may be seen that cascading multiple multiplexer/demultiplexers 200 together allows more wavelengths to be split than with a single device.

The preceding description describes a demultiplexing function. But it will be recognized that the same configuration may be used for the multiplexing function. In that case, the individual colors are initiated on waveguides 125 and follow the reverse path of that described above, ending up combined in an optical signal on waveguide 130.

Multiplexer/demultiplexer 200 has a variety of advantages over the prior art devices. The known prior art uses band-pass filters to differentiate between wavelengths. Such devices are orders of magnitude more expensive than long-pass filters. Moreover, manufacturing of long-pass filters involves only 15 to 30 layers of metal as opposed to the approximately 100 layers associated with band-pass filters. As such, the yields associated with long-pass filters are in the 80–90% range, rather than the 2–5% range for band-pass filters, especially those with the tight range necessary for separating densely packed wavelengths.

Figure 3:
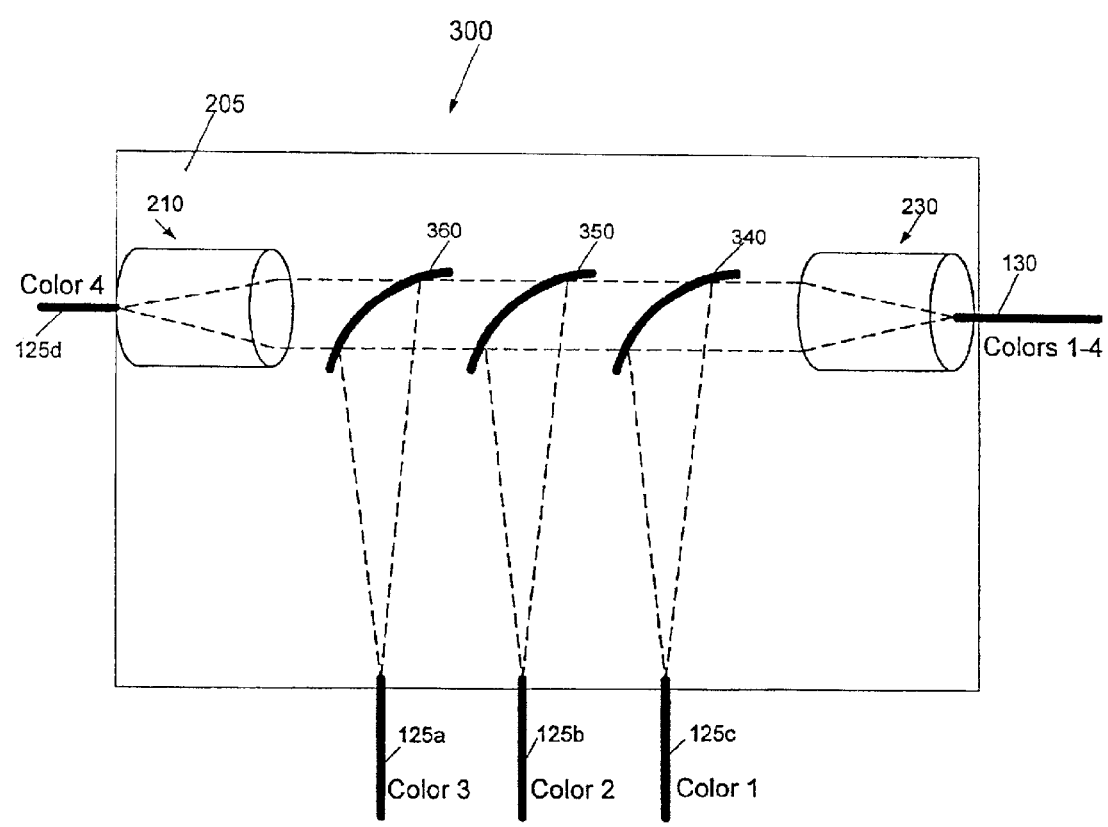
FIG. 3 is a diagram of a second embodiment of a multiplexer/demultiplexer of the present invention using curved filters.

FIG. 3 shows a second embodiment of the present invention. A coarse wave division multiplexer/demultiplexer 300 is shown using filters 340, 350, and 360 to transmit optical signals into waveguides 125a–c. As described above with respect to filters 240–260, filters 340–360 are long-pass or short-pass filters with specified wavelengths designed to differentiate between the various colors being carried on waveguide 130. But in contrast to those filters, filters 340–360 are built on a concave curved substrate. The curvature on the receiving edge of filters 340–360 reflects some of the selected colors and focuses the light signal with those selected colors. Preferably, optical waveguides 125a–c are positioned such that colors reflected from the concave surfaces of filters 340–360 are focused into waveguide 125a, without the use of any other lens. Of course, such an arrangement reduces the number of lenses necessary to accomplish the multiplexing and demultiplexing function.

Figure 4:
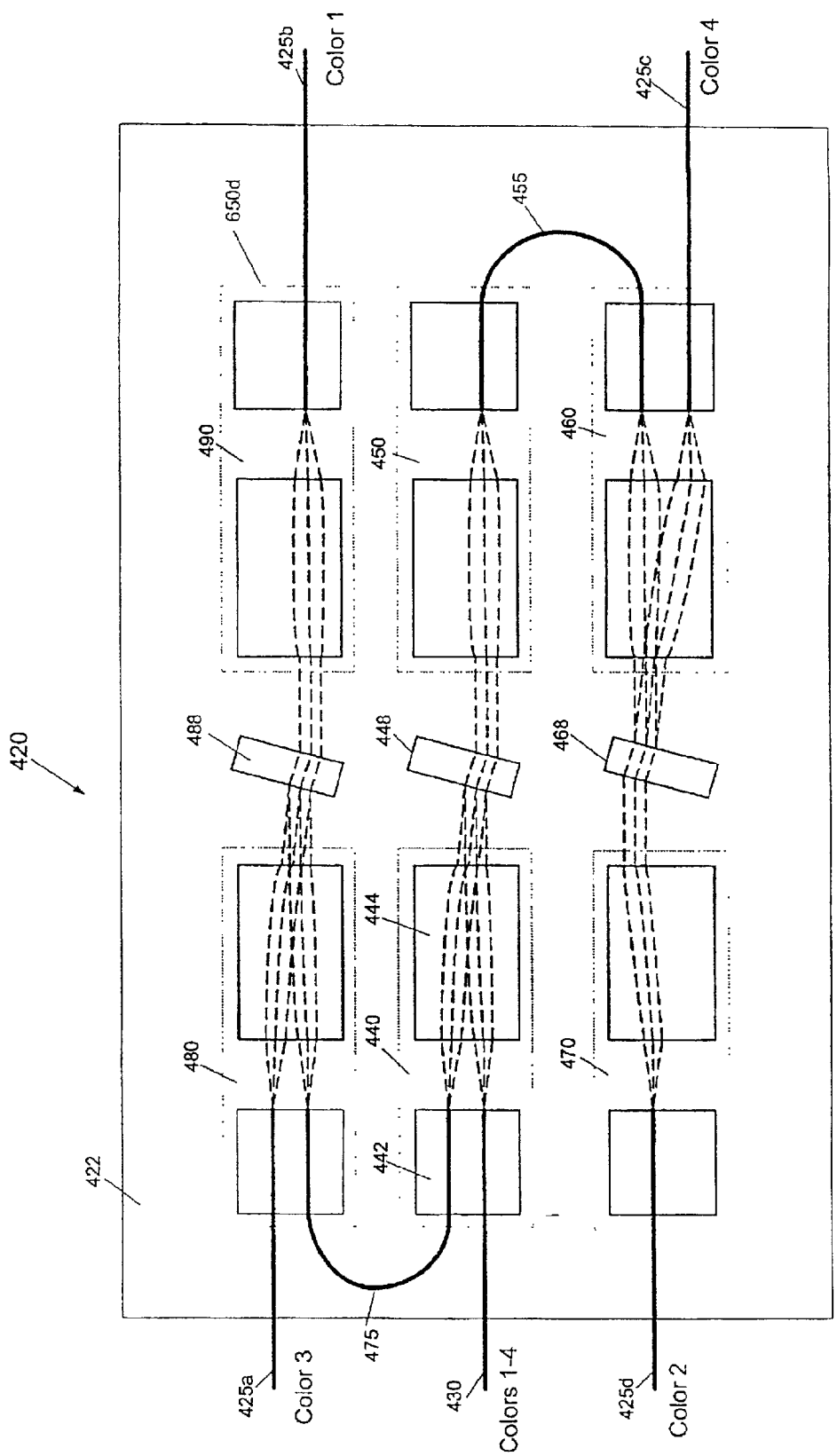
FIG. 4 is a diagram of a second embodiment of a multiplexer/demultiplexer of the present invention using dual capillary GRIN lenses.

FIG. 4 shows a third embodiment of a coarse wave division multiplexer/demultiplexer 420. Optical multiplexer/demultiplexer 420 receives or transmits a plurality of colors on waveguide 430, and receives or transmits a subset of the plurality of colors on each of the waveguides 425a, 425b, 425c, and 425d. Typically, a single color is transmitted on waveguides 425, but the invention is not so limited. Moreover, though only four colors are shown in FIG. 4, the invention is not limited to exactly four colors, but may be useful for more than four or less than four colors being combined onto a single waveguide 430. In the specific embodiment, waveguide 420 carries four wavelengths (colors 1–4) while waveguide 425a carries color 3, waveguide 425b carries color 1, waveguide 425c carries color 4, and waveguide 425d carries color 2. The colors are named for convenience in this description and have no bearing on any relationship between the wavelengths of those colors.

A housing 422 provides structure and stability to multiplexer/demultiplexer 420. Waveguides 425 and 430 extend outwardly from housing 422 to provide connection to other optical devices as shown in FIG. 1. The other devices described herein are mounted rigidly within housing 422.

A collimator assembly 440 is optically coupled to waveguide 430. Collimator assembly 440 is a dual capillary GRIN lens comprising a waveguide assembly 442 with two optical waveguides and a GRIN lens 444. One of the optical waveguides of waveguide assembly 442 is coupled to waveguide 430. Typical optical waveguides used include SMF28 single mode fiber by Corning, LEEF fiber or Metricore fiber. A metal tube secures waveguide assembly 442 rigidly at a fixed distance from GRIN lens 444. The numerical aperture of the waveguide and the wavelength of the optical signals determine the distance between the end of the waveguides and the GRIN lens. As described above, a GRIN lens is a transparent, cylindrical device formed from glass or other transparent material. It is characterized by having an index of refraction that varies predictably throughout the device. GRIN lenses are used especially for focusing a collimated beam of light into a narrow beam of light (if used in one direction) or dispersing a light source to create a collimated beam of light (if used in the other direction).

A filter 448 is optically coupled to the other side of dual capillary GRIN lens of the collimator assembly 440. Filter 448 is oriented such that light carried on waveguide 430 passes through one of the waveguides in collimator assembly 440 and strikes a surface of filter 448. Filter 448 is a long-pass filter or a short-pass filter and may be fabricated in the manner described above with respect to filter 240. Filter 448 is calibrated such that the specified wavelength is at a point whereby some of the wavelengths carried on waveguide 430 are on one side of the specified wavelength and the others are on the other side of the specified wavelength. Thus, in the specific embodiment, filter 448 is calibrated to reflect color 1 and color 3, and to pass color 2 and color 4. Moreover, filter 448 is oriented such that the reflected light is directed to the other waveguide of waveguide assembly 442.

Another collimator assembly 450 is optically coupled to filter 448. It is located on the opposite side of filter 448 from collimator assembly 440 such that light that is passed through filter 448 enters collimator assembly 450. Collimator assembly may be a single capillary GRIN lens. A single capillary GRIN lens is similar to the dual capillary lens GRIN lens described above, but has only one waveguide. Collimator assembly 450 is oriented such that the GRIN lens portion is optically coupled to filter 448 and light passing through filter 448 is focused onto the waveguide.

A jumper waveguide 455 is attached to the waveguide of collimator assembly 450. Waveguide 455 optically couples collimator assembly 450 to another collimator assembly 460. In the specific embodiment, jumper waveguide 455 carries color 2 and color 4. Collimator assembly 460 is a dual capillary GRIN lens similar to collimator assembly 440. A first waveguide of collimator assembly 460 is coupled to jumper waveguide 455 and the other is coupled to waveguide 425c.

A filter 468 is located on the opposite side of collimator assembly 460. Filter 468 is a long or short-pass filter that is oriented such that the light from collimator assembly 460 strikes one of its surfaces. Filter 468 has a specified frequency such that some of the frequencies carried on jumper waveguide 455 are reflected and others are passed. Filter 468 is also oriented such that the wavelengths that are reflected because they are on one side of the specified frequency are reflected back to waveguide 425c. In the specific embodiment, color 4 is reflected to waveguide 425c and color 2 is passed.

Another collimator assembly 470 is optically coupled to filter 468. It is located on the opposite side of filter 468 from collimator assembly 460 such that light that passed through filter 468 enters collimator assembly 470. Collimator assembly may be a single capillary GRIN lens. It is also oriented such that the GRIN lens portion is optically coupled to filter 468 and light passing through filter 468 is focused onto the waveguide. The waveguide is optically coupled to waveguide 425d. Thus, in the specific embodiment, color 2 is carried on waveguide 425d.

Referring back to the second waveguide of collimator assembly 440, it is optically coupled to a jumper waveguide 475. Waveguide 475 optically couples collimator assembly 440 to another collimator assembly 480. In the specific embodiment, jumper wveguide 475 carries color 1 and color 3. Collimator assembly 480 is also a dual capillary GRIN lens similar to collimator assembly 440. A first waveguide of collimator assembly 480 is coupled to jumper waveguide 475 and the other is coupled to waveguide 425a.

A filter 488 is located on the opposite side of collimator assembly 480. Filter 488 is a long or short-pass filter that is oriented such that the light from collimator assembly 480 strikes one of its surfaces. Filter 488 has a specified frequency such that some of the frequencies carried on jumper waveguide 475 are reflected and others are passed. Filter 488 is also oriented such that the wavelengths that are reflected because they are on one side of the specified frequency are reflected back to waveguide 425a. In the specific embodiment, color 3 is reflected to waveguide 425a and color 1 is passed.

Another collimator assembly 490 is optically coupled to filter 488. It is located on the opposite side of filter 488 from collimator assembly 480 such that light that passed through filter 488 enters collimator assembly 490. Collimator assembly 490 may be a single capillary GRIN lens. It is also oriented such that the GRIN lens portion is optically coupled to filter 488 and light passing through filter 488 is focused onto the waveguide. The waveguide is optically coupled to waveguide 425b. Thus, in the specific embodiment, color 1 is carried on waveguide 425b.

In operation, multiplexer/demultiplexer 420 may operate in the direction described above as a demultiplexer splitting a plurality of colors carried on waveguide 430 to individual waveguides 425. Alternatively, multiplexer/demultiplexer 420 may operate as a multiplexer combining the different colors carried on waveguides 425 to a common signal carried on waveguide 430. Moreover, multiplexer/demultiplexer 420 may operate on more or fewer wavelengths than that described herein. It will readily be seen that the present invention may be expanded to have more collimator lens assemblies to handle more different wavelengths. For example, another dual capillary grin lens, filter and single capillary GRIN lens combination may be coupled to the waveguide of collimator assembly 470 to allow a fifth wavelength to be split. Alternatively, fewer collimator lens assemblies may be used if fewer colors are desired.

The several specific embodiments have been described, the embodiments are intended as examples only. No limitation is intended or implied by the description. Variations and additions to the embodiments shown will be readily apparent to one of skill in the art with the benefit of this disclosure. The invention is intended to be limited only by the attached claims.

What is claimed is:

1. An optical device comprising:
   a first I/O waveguide carrying an optical signal with a plurality of wavelengths;
   a second I/O waveguide carrying a first wavelength of the plurality of wavelengths;
   a third I/O waveguide carrying a second wavelength of the plurality of wavelengths;
   a first single-side-pass filter optically coupled to the first I/O waveguide, wherein the first single-side-pass filter reflects the first wavelength between the first I/O waveguide and the second I/O waveguide, and the first single-side-pass filter passes the second wavelength between the first I/O waveguide and the third I/O waveguide; and
   a housing, and wherein
   the first I/O waveguide extends outwardly from the housing, and wherein
   the first single-side-pass filter is mounted in the housing, and wherein
   the first single-side-pass filter is a short-pass filter, and wherein
   the first single-side-pass filter includes a transparent substrate on which several thin layers of different types of metal have been deposited by a sputtering technique.

2. An optical device comprising:
   a first I/O waveguide carrying an optical signal with a plurality of wavelengths;
   a second I/O waveguide carrying a first wavelength of the plurality of wavelengths;
   a third I/O waveguide carrying a second wavelength of the plurality of wavelengths;
   a first single-side-pass filter optically coupled to the first I/O waveguide, wherein the first single-side-pass filter reflects the first wavelength between the first I/O waveguide and the second I/O waveguide, and the first single-side-pass filter passes the second wavelength between the first I/O waveguide and the third I/O waveguide;
   a first collimator assembly comprising a first GRIN lens, a fourth waveguide, and a fifth waveguide, and wherein the first GRIN lens is optically coupled to the first single-side-pass filter, the fourth waveguide optically coupled to the first I/O waveguide, and the fifth waveguide optically coupled to the second I/O waveguide, wherein the first single-side-pass filter reflects the first wavelength between the first I/O waveguide and the second I/O waveguide through the fifth waveguide of the first collimator assembly;
   a second collimator assembly comprising a second GRIN lens, and a sixth waveguide, and wherein the second GRIN lens is optically coupled to the first single-side-pass filter, and wherein the first single-side-pass filter passes the second wavelength between the first I/O waveguide and the third I/O waveguide through the sixth waveguide of the second collimator assembly;
   a third collimator assembly comprising a third GRIN lens, a seventh waveguide, and an eighth waveguide, and wherein the seventh waveguide is optically coupled to the fifth waveguide of the first collimator assembly;
   a fourth collimator assembly comprising a fourth GRIN lens, and a ninth waveguide;
   a second single-side-pass filter optically coupled to the third GRIN lens of the third collimator assembly and the fourth GRIN lens of the fourth collimator assembly, wherein the second single-side-pass filter reflects a third wavelength of the plurality of wavelengths between the seventh waveguide of the third collimator assembly and the eighth waveguide of the third collimator assembly, and passes the first wavelength of the plurality of wavelengths between the seventh waveguide of the third collimator assembly and the ninth waveguide of the fourth collimator assembly;
   a fifth collimator assembly comprising a fifth GRIN lens, a tenth waveguide, and an eleventh waveguide, and wherein the tenth waveguide is optically coupled to the sixth waveguide of the second collimator assembly;
   a sixth collimator assembly comprising a sixth GRIN lens, and a twelfth waveguide;
   a third single-side-pass filter optically coupled to the fifth GRIN lens of the fifth collimator assembly and the sixth GRIN lens of the sixth collimator assembly, wherein the third single-side-pass filter reflects a fourth wavelength of the plurality of wavelengths between the tenth waveguide of the fifth collimator assembly and the eleventh waveguide of the fifth collimator assembly, and passes the second wavelength between the tenth waveguide of the fifth collimator assembly and the twelfth waveguide of the sixth collimator assembly;
   a housing, and wherein
   the first I/O waveguide extends outwardly from the housing, and wherein
   the first single-side-pass filter is mounted in the housing, and wherein
   the second single-side-pass filter is mounted in the housing, and wherein
   the third single-side-pass filter is mounted in the housing, and wherein
   specified wavelengths for the first, second, and third single-side-pass filters are separated by approximately 25.6 nanometers, and wherein
   the first single-side-pass filter includes a transparent substrate on which several thin layers of different types of metal have been deposited by a sputtering technique, and wherein the first GRIN lens includes a transparent material having a cylindrical shape, and wherein the cylindrical shape includes a center and an edge, and wherein the first GRIN lens has a first index of refraction substantially equal to 1.52 at the center, and a second index of refraction substantially equal to 1.55 at the edge.

3. An optical device comprising:

a first I/O waveguide carrying an optical signal with a plurality of wavelengths;

a second I/O waveguide carrying a first wavelength of the plurality of wavelengths;

a third I/O waveguide carrying a second wavelength of the plurality of wavelengths;

a first single-side-pass filter optically coupled to the first I/O waveguide, wherein the first single-side-pass filter reflects the first wavelength between the first I/O waveguide and the second I/O waveguide, and the first single-side-pass filter passes the second wavelength between the first I/O waveguide and the third I/O waveguide;

a first collimator assembly comprising a first GRIN lens, a fourth waveguide, and a fifth waveguide, and wherein the first GRIN lens is optically coupled to the first single-side-pass filter, the fourth waveguide optically coupled to the first I/O waveguide, and the fifth waveguide optically coupled to the second I/O waveguide, wherein the first single-side-pass filter reflects the first wavelength between the first I/O waveguide and the second I/O waveguide through the fifth waveguide of the first collimator assembly;

a second collimator assembly comprising a second GRIN lens, and a sixth waveguide, and wherein the second GRIN lens is optically coupled to the first single-side-pass filter, and wherein the first single-side-pass filter passes the second wavelength between the first I/O waveguide and the third I/O waveguide through the sixth waveguide of the second collimator assembly;

a third collimator assembly comprising a third GRIN lens, a seventh waveguide, and an eighth waveguide, and wherein the seventh waveguide is optically coupled to the fifth waveguide of the first collimator assembly;

a fourth collimator assembly comprising a fourth GRIN lens, and a ninth waveguide;

a second single-side-pass filter optically coupled to the third GRIN lens of the third collimator assembly and the fourth GRIN lens of the fourth collimator assembly, wherein the second single-side-pass filter reflects a third wavelength of the plurality of wavelengths between the seventh waveguide of the third collimator assembly and the eighth waveguide of the third collimator assembly, and passes the first wavelength of the plurality of wavelengths between the seventh waveguide of the third collimator assembly and the ninth waveguide of the fourth collimator assembly;

a fifth collimator assembly comprising a fifth GRIN lens, a tenth waveguide, and an eleventh waveguide, and wherein the tenth waveguide is optically coupled to the sixth waveguide of the second collimator assembly;

a sixth collimator assembly comprising a sixth GRIN lens, and a twelfth waveguide;

a third single-side-pass filter optically coupled to the fifth GRIN lens of the fifth collimator assembly and the sixth GRIN lens of the sixth collimator assembly, wherein the third single-side-pass filter reflects a fourth wavelength of the plurality of wavelengths between the tenth waveguide of the fifth collimator assembly and the eleventh waveguide of the fifth collimator assembly, and passes the second wavelength between the tenth waveguide of the fifth collimator assembly and the twelfth waveguide of the sixth collimator assembly;

a housing, and wherein the first I/O waveguide extends outwardly from the housing, and wherein the first single-side-pass filter is mounted in the housing, and wherein the second single-side-pass filter is mounted in the housing, and wherein the third single-side-pass filter is mounted in the housing, and wherein a specified wavelength of the first single-side-pass filter is approximately 1550.02 nanometers, a specified wavelength of the second single-side-pass filter is approximately 1524.38 nanometers, and a specified wavelength of the third single-side-pass filter is approximately 1575.62 nanometers. and wherein the first single-side-pass filter includes a transparent substrate on which several thin layers of different types of metal have been deposited by a sputtering technique, and wherein the first GRIN lens includes a transparent material having a cylindrical shape, and wherein the cylindrical shape includes a center and an edge, and wherein the first GRIN lens has a first index of refraction substantially equal to 1.52 at the center, and a second index of refraction substantially equal to 1.55 at the edge.

4. An optical device comprising:

a first I/O waveguide carrying an optical signal with a plurality of wavelengths;

a second I/O waveguide carrying a first wavelength of the plurality of wavelengths;

a third I/O waveguide carrying a second wavelength of the plurality of wavelengths;

a fourth I/O waveguide carrying a third wavelength of the plurality of wavelengths;

a fifth I/O waveguide carrying a fourth wavelength of the plurality of wavelengths;

a first single-side-pass filter optically coupled to the first I/O waveguide, wherein the first single-side-pass filter reflects the first wavelength between the first I/O waveguide and the second I/O waveguide, and the first single-side-pass filter passes the second wavelength between the first I/O waveguide and the third I/O waveguide;

a second single-side-pass filter, wherein the second single-side-pass filter reflects the third wavelength between the first I/O waveguide and the fourth I/O waveguide and passes the second wavelength between the first I/O waveguide and the third I/O waveguide;

a third single-side-pass filter, wherein the third single-side-pass filter reflects the fourth wavelength between the first I/O waveguide and the fifth I/O waveguide and passes the second wavelength between the first I/O waveguide and the third I/O waveguide; and a housing, and wherein the first I/O waveguide extends outwardly from the housing, and wherein the first single-side-pass filter is mounted in the housing, and wherein the second single-side-pass filter is mounted in the housing, and wherein the third single-side-pass filter is mounted in the housing, and wherein the first, second, and third single-side-pass filters are separated by approximately 25.6 nanometers, and wherein the first single-side-pass filter includes a transparent substrate on which several thin layers of different types of metal have been deposited by a sputtering technique.

5. An optical device comprising:

a first I/O waveguide carrying an optical signal with a plurality of wavelengths;

a second I/O waveguide carrying a first wavelength of the plurality of wavelengths;

a third I/O waveguide carrying a second wavelength of the plurality of wavelengths;

a first single-side-pass filter optically coupled to the first I/O waveguide, wherein the first single-side-pass filter reflects the first wavelength between the first I/O waveguide and the second I/O waveguide, and the first single-side-pass filter passes the second wavelength between the first I/O waveguide and the third I/O waveguide; and a housing, and wherein the first I/O waveguide extends outwardly from the housing, and wherein the first single-side-pass filter is mounted in the housing, and wherein the first single-side-pass filter is curved, and wherein the first single-side-pass filter includes a transparent substrate on which several thin layers of different types of mental have been deposited by a sputtering technique.

* * * * *